United States Patent
Hermann et al.

(10) Patent No.: US 10,442,394 B2
(45) Date of Patent: Oct. 15, 2019

(54) BELT TONGUE COMPRISING A TORSION BAR

(71) Applicant: Autoliv Development AB, Vårgårda (SE)

(72) Inventors: Michel Hermann, Pinneberg (DE);
Martin Grikschat, Münsterdorf (DE);
Inga Krambeck, Elmshorn (DE);
Hans-Jörg Cord, Norderstedt (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/513,587

(22) PCT Filed: Sep. 30, 2015

(86) PCT No.: PCT/EP2015/072514
§ 371 (c)(1),
(2) Date: Mar. 23, 2017

(87) PCT Pub. No.: WO2016/050820
PCT Pub. Date: Apr. 7, 2016

(65) Prior Publication Data
US 2017/0297528 A1    Oct. 19, 2017

(30) Foreign Application Priority Data

Sep. 30, 2014  (DE) .................. 10 2014 114 207

(51) Int. Cl.
*B60R 22/185*    (2006.01)
*B60R 22/18*    (2006.01)
*A44B 11/25*    (2006.01)

(52) U.S. Cl.
CPC ...... *B60R 22/1855* (2013.01); *A44B 11/2557* (2013.01); *A44B 11/2561* (2013.01); *B60R 2022/1812* (2013.01)

(58) Field of Classification Search
CPC ............ A44B 11/2557; B60R 22/1812; B60R 22/1855
See application file for complete search history.

(56) References Cited

U.S. PATENT DOCUMENTS 2,919,481 A * 1/1960 Finken .................. A44B 11/28
24/196
3,414,947 A * 12/1968 Holmberg .......... A44B 11/2557
24/196

(Continued)

FOREIGN PATENT DOCUMENTS

DE       2 320 314       10/1974
DE    202010013986 U1    1/2012

(Continued)

OTHER PUBLICATIONS

International Search Report for Application No. PCT/EP2015/072514, dated Dec. 15, 2016, Form PCT/ISA/210, 3 pgs.

(Continued)

*Primary Examiner* — Robert Sandy
*Assistant Examiner* — David M Upchurch
(74) *Attorney, Agent, or Firm* — Brinks Gilson & Lione (57) ABSTRACT

A belt tongue (1) having a tongue body (3) extending in an insertion direction (2), a clamping element (4) in the tongue body such that a belt strap (7) guided through a cavity (5) in the tongue body (3) and running through a gap (6) can be moved through the tongue body (3) in an unstressed free-running position and, in a stressed position brought about by a tensile force in the belt strap (7), is clamped on a clamping edge (8) of the cavity (5) by the clamping element (4) that is pivotally mounted in the tongue body (3). A pre-tensioning device exerts a retractive force on the clamping element (4), at least in the stressed position, the force being oriented in the direction of the free-running position of the clamping element (4). The pre-tensioning device is a torsion bar (13)

(Continued)

that is non-rotatably secured in the tongue body (3) and non-rotatably connected to the clamping element (4).

12 Claims, 7 Drawing Sheets (56) References Cited

U.S. PATENT DOCUMENTS

| | | | |
|---|---|---|---|
| 3,898,715 A | | 8/1975 | Balder |
| 4,184,234 A | * | 1/1980 | Anthony ............ A44B 11/2557 24/171 |
| 4,876,770 A | * | 10/1989 | Bougher ............ A44B 11/2557 24/170 |
| 5,311,653 A | * | 5/1994 | Merrick ................ A44B 11/10 24/171 |
| 5,411,292 A | * | 5/1995 | Collins ............... B60R 22/1855 280/806 |
| 5,870,816 A | * | 2/1999 | McFalls ............. A44B 11/2553 24/170 |
| 7,010,836 B2 | * | 3/2006 | Acton ................ A44B 11/2557 24/170 |
| 8,087,696 B2 | * | 1/2012 | Mather ............... B60R 22/1951 280/807 |
| 8,813,316 B2 | * | 8/2014 | Richter ................... B60R 22/18 24/168 |
| 9,174,554 B2 | * | 11/2015 | Maciejczyk ........... B60N 2/265 |
| 2006/0138852 A1 | * | 6/2006 | Ichida ................ A44B 11/2557 297/483 |
| 2006/0226694 A1 | * | 10/2006 | Higuchi .............. B60R 22/4604 297/480 |
| 2009/0025193 A1 | | 1/2009 | Fyhr |
| 2012/0068520 A1 | | 3/2012 | McFalls et al. |
| 2012/0286501 A1 | | 11/2012 | Goudeau et al. |
| 2013/0341994 A1 | * | 12/2013 | Boughner .......... A44B 11/2561 297/468 |
| 2015/0173461 A1 | | 6/2015 | Okano et al. |
| 2017/0055643 A1 | | 3/2017 | Knoedl |

FOREIGN PATENT DOCUMENTS

| | | |
|---|---|---|
| DE | 112012002030 T5 | 2/2014 |
| WO | WO 2007/090551 A1 | 8/2007 |
| WO | WO 2014/013987 A1 | 1/2014 |
| WO | WO 2015/140341 A1 | 9/2015 |
| WO | WO 2015/172879 A1 | 11/2015 |

OTHER PUBLICATIONS

German Office Action, Application No. 10 2014 114 207.1, dated Sep. 14, 2015, 2 pgs.

\* cited by examiner

BELT TONGUE COMPRISING A TORSION BAR

CROSS-REFERENCE TO RELATED APPLICATIONS

This application is a 35 U.S.C. § 371 national phase application of International PCT Application No.: PCT/EP2015/072514, filed Sep. 30, 2015, which claims the benefit of priority to German Patent Application No.: 10 2014 114 207.1, filed Sep. 30, 2014, the contents of which are incorporated herein by reference in their entirety.

FIELD OF THE INVENTION

The present invention relates to a belt tongue for a motor vehicle seat belt restraint system including a tongue body extending in an insertion direction, wherein a clamping element is disposed such that a belt strap guided through a cavity in the tongue body and extending through a gap formed between the clamping element and the tongue body is movable by the tongue body in an unstressed, pass-through position, and in a stressed position caused by a tensile force introduced into the belt strap, is clamped to a clamp edge of the cavity by means of the clamp element pivot-mounted in the tongue body and pivoting into the cavity, wherein in the stressed position, a pre-stress device exerts a restoring force on the clamping element directed toward the pass-through position of the clamping element.

BACKGROUND

A belt tongue having the above-mentioned features is known, for example, from DE 20 2010 013 986 U1. A clamping device referred to as a locking cam is pivotably supported in the tongue body, wherein a spring is provided as a pre-stress device that applies a force to the clamping element pivotably supported in the tongue body in a pass-through position. In a stressed position the belt strap extending through a cavity in the tongue body is clamped between the clamping element and a clamping edge formed on the cavity, extending parallel to the surface of the belt strap. It turns out that in certain situations the belt strap is also clamped at the lateral regions of the clamping element between the clamping element and a lateral edge of the cavity, wherein the belt strap is kinked. The disadvantage results therefrom that in a stressed position, the force applied by the spring is not sufficient to release the locking position caused by the laterally clamped belt strap.

The object of the present invention is therefore to at least partially solve the problems outlined with respect to the prior art and in particular to specify a belt tongue wherein the locking position of the belt strap between the clamping element and a lateral edge of the cavity can be released.

SUMMARY

These above-referenced objects are achieved using a belt tongue having the features of the representative embodiments described herein and illustrated by the appended drawings.

These objects are achieved in particular by a belt tongue including the above-mentioned features, wherein the pre-stress device is a torsion bar attached in the tongue body for conjoint rotation therewith and connected to the clamping element for conjoint rotation therewith. In particular, the clamping element is pivotably supported by the torsion bar. Alternatively, the clamping element is not pivotably supported by the torsion bar.

The tongue body thus includes a cavity through which the belt strap is guided. The tongue body comprises in particular a metallic core and a plastic part molded onto the core. The tongue body further includes a clamping element, which is pivotably supported on the tongue body, wherein the clamping element includes in particular a clamping region that comes into abutment with the belt strap at least in the stressed position. In the non-stressed, pass-through position, the gap formed in particular between the clamping region of the clamping element and a clamping edge of the cavity, which clamping edge extends in particular parallel to the clamping region and the belt surface, is sufficiently large that the belt strap is freely movable through the gap.

In particular, with regard to a lap-belt section of the belt strap, if a tensile force is now applied to a belt tongue inserted into a belt buckle, then a force is applied by the belt strap onto the clamping element such that the clamping element pivots and consequently the gap between the clamp region of the clamping element and the clamping edge of the cavity is diminished, wherein in particular the clamping region of the clamping element is pivoted into the cavity. If the force introduced into the lap belt is great enough, then the belt strap is fixedly clamped in the cavity between the clamping region of the clamping element and the clamping edge of the cavity.

At least in the stressed position, the torsion bar exerts a restoring force on the clamping element. During pivoting of the clamping element the torsion bar is elastically deformed, in particular twisted, from the pass-through position into the stressed position, wherein the clamping element is pivoted in particular by at most 60, preferably by at most 40. For this purpose the torsion bar is made of a suitable material. With the twisting of the torsion bar about its longitudinal axis, which twisting is generated by the pivoting of the clamping element and occurs at least in partial sections, wherein a torsional moment acts on the torsion bar, the torsion bar thus exerts a torque directed opposite the torsional moment, which results in the restoring force on the clamping element. The torsion bar can be designed as a single piece with the clamping element, or can be an individual part of the belt tongue. The torsion bar can generate a relatively large restoring force.

The torsion bar can also have an additional function. In this case, the clamping element is pivotably supported in the tongue body by the torsion bar. Then in particular no further provisions are made for a pivot support of the torsion bar in the tongue body.

In particular when the clamping element forms an individual component of the belt tongue, the torsion bar is only attached to one side of the tongue body for conjoint rotation therewith (i.e. fixed regarding relative rotation), and is only connected to the clamping element on the side of the clamping element that is not associated with the side of the tongue body attached to the torsion bar. Due to the attachment of the torsion bar to the tongue body and the clamping element, as provided on different sides of the belt tongue, the region of the torsion bar twisted in the event of a pivoting of the clamping element has a maximum length, whereby an elastic (rotational) deforming of the torsion bar occurs across the possible angular range.

In order to prevent the belt strap from arriving between a lateral edge of the cavity and the clamping element, the invention provides that guide sections are disposed laterally on the clamping element, between which the belt strap extends so that in the lateral region of the cavity the belt strap does not arrive between the clamping element and the tongue body. In this case, the cavity has recesses formed to the side of the clamping edge, aligned in the insertion direction, in which the guide sections of the clamping element are disposed at least in the stressed position. Guide sections in particular protruding over the clamping region of the clamping element are thus disposed laterally on the clamping element. The guide sections extend in particular in a direction out over the clamping region of the clamping element, on which region the belt strap is guided by the tongue body both in the pass-through position and in the stressed position. Consequently the belt is laterally delimited by the guide sections and can in particular not come into abutment with the lateral edges of the cavity.

In order that the belt is laterally delimited by guide sections in particular in the region of the clamping edge of the cavity, in the stressed position, the guide sections of the clamping element engage in the recesses or are in particular also already disposed in the recesses in the pass-through position, which recesses extend laterally from the clamp edge in the insertion direction and thus form a region of the opening. Due to the recesses extending in the insertion direction, the installation height of the belt tongue can be reduced in the insertion direction.

The guide sections each have in particular a circular-arc-shaped edge that is disposed in the recess at least in the stressed position, but does not protrude over the tongue body.

The above-mentioned objects are also achieved independently from the above-described embodiments and in particular independently of the forming of guide sections on the clamp element, in that on the tongue body, at least one projection protruding into the cavity is formed, and on the clamping element at least one groove is formed, into which groove the projection engages at least during the pivoting movement, such that in the stressed state the projection on an end surface of the groove comes into abutment with the clamping element and the pivoting movement of the pivot element is thereby limited.

The projection is formed in particular on side of the cavity opposite the clamping edge of the cavity. The projection forms a stop for the pivoting movement of the clamping element, whereby in the stressed position, as the force introduced into the belt strap increases, the force acting on the belt strap is limited, since after abutment of the end surfaces of the groove on the projection, the force is introduced into the tongue body and a further pivoting of the clamping element no longer occurs. Consequently, a self-clamping of the belt strap could be avoided in the attachment position, and in a design without guide sections on the clamping element, the locking force of a portion of the belt strap arriving between the clamping element and the lateral edge of the opening could be limited. Consequently, despite the clamping of the belt strap between clamping element and lateral edge of the opening, a reversing from the locking position into the pass-through position is possible.

According to an additional embodiment of the belt tongue in accordance with the present invention, one guide element projects laterally from each of the two guide sections, which guide elements are disposed at least partially surrounding the sockets accommodating the torsion bar, or are disposed at the guide depressions in the tongue body abutting against the sockets. In this case, the guide elements and the guide depressions are formed such that the pivot movement of the clamping element is guided by the guide elements moved into the guide depressions. Due to this design, an additional or alternative pivoting support can be formed, wherein the guide depressions preferably also form a stop for the pivot movement of the clamping element. In particular when the clamping element is not pivotably supported by the torsion bar, it is preferred that no guide element respectively projects laterally from the two guide sections and that none of the sockets receiving the torsion bar are disposed in the tongue body at least partially surrounding the guide depressions. The clamping element is preferably pivotably supported on the buckle body predominantly via the guide elements engaging in the guide depressions, so that the torsion bar is present mainly for providing the restoring force and has no influence on the pivoting support.

In this context, the present invention provides that a rectilinear assembly depression extending up to an edge of the tongue body respectively, connects to the guide depressions, by which the clamping element is linearly displaced with the guide elements during assembly, wherein the clamping element is secured against shifting back due to subsequent pivoting. After the pivoting, a projection of the guide elements onto the respective assembly depressions is greater than the width of the corresponding assembly depressions, so that the guide elements cannot arrive back in the assembly depressions. In such a pivoted state in particular the torsion bar can be introduced through the clamping element, so that even after pivoting back, the clamping element is secured by the assembly depression against shifting back. In this case the torsion bar has two functions. On the one hand it secures the clamping element against shifting back, and on the other hand provides a restoring force with the pivoting of the clamping element. A simple assembly of the clamping element and the torsion bar is thus also possible.

According to another design of the belt tongue, the invention provides that the belt strap is simply pulled through the opening in the tongue body transverse to the insertion direction, by which it is meant that the belt strap is guided only once through the tongue body, namely through the cavity in the tongue body and thus extends through the tongue body from a front side of the belt tongue to a rear side of the belt tongue. It is thereby precluded in particular that the belt strap forms a loop in the region of the belt tongue, wherein the belt strap has been introduced into the belt tongue from the same side in which it has also been guided out.

In one preferred embodiment of the present invention, the torsion bar already exerts a force in the pass-through position on the clamping element directed opposite the stressed position. The advantage obtained is that the clamping element is always pre-stressed in a position such that rattling noises can be avoided.

In this context the present invention provides in particular that a socket on the tongue body that is provided for conjoint rotation with the torsion bar, and the torsion bar itself are configured such that a first end of the torsion bar, which end is to be fixed in the socket, must be twisted for fixing on the tongue body opposite the second end placed on the clamping element for conjoint rotation therewith, while the clamping element is located in the pass-through position. For assembly, the clamping element is thus first engaged in the tongue body and oriented such that the torsion bar can be introduced by the second end through the socket in the tongue body in a channel in the torsion bar. The torsion bar and the channel in the clamping element are at least regionally configured such that they cannot be rotated relative to each other. When the torsion bar is inserted into this region by its second end, the first end of the torsion bar must be twisted forming a torsional moment in the torsion bar, until the first end can be introduced into the corresponding socket in the tongue body. Due to the torsional moment present in the torsion bar, a pre-stress is induced on the clamping element. In particular, after the opposite-side twisting of the first and second end, the torsion bar must still be axially pushed into the corresponding socket in the tongue body.

In order to allow the torsion bar to exert a pre-stress in the pass-through position solely due to axial insertion into the belt tongue, and that with the assembly an active twisting of the torsion bar can be omitted, the invention provides that the torsion bar includes a first cross-sectional contour on the first end to be fixed in the socket, which contour corresponds to a second contour of the second end of the cross-sectional shape, which second end is placed in the clamping element for conjoint rotation therewith, wherein in a relaxed state of the torsion bar the cross-sectional contours of the two ends are rotated with respect to each other about an axis of rotation and the transition from the first cross-sectional contour to the second cross-sectional contour is continuous, while maintaining the cross-sectional shape, so that with the second end placed in the clamping element for conjoint rotation therewith, the torsion bar is twisted exclusively by insertion of the first end into the socket. Thus the invention provides that in a not-yet engaged state, the torsion bar has a twisted shape in its longitudinal extension, which twisted shape is necessarily untwisted during insertion of the torsion bar into the clamping element and into the socket in the tongue body, whereby a torsional moment is induced in the torsion bar, which applies a force onto the clamping element in the pass-through position.

BRIEF DESCRIPTION OF THE DRAWINGS

The invention as well as its technical environment are explained below by examples based on the figures. The schematics depict.

DETAILED DESCRIPTION

The first exemplary embodiment of a belt tongue 1 depicted in FIGS. 1 to 4 serves for explaining the functionality of the belt tongue 1, but does not have all claimed features. The belt tongue 1 comprises a tongue body 3 that extends in an insertion direction 2. A cavity 5 is formed in the tongue body 3, which is bounded below in sections, in the insertion direction 2 by a clamping edge 8. Laterally to the clamping edge 8, recesses 10 extend in the insertion direction 2. On the side of the cavity 5 facing away from the clamping edge 8, projections 14 on the tongue body 3 are formed and protrude into the cavity 5. Furthermore, on the tongue body 3 a retaining point 17 is formed and a middle region of a leaf spring 12 comes to rest thereon.

Figures 1A, 1B:
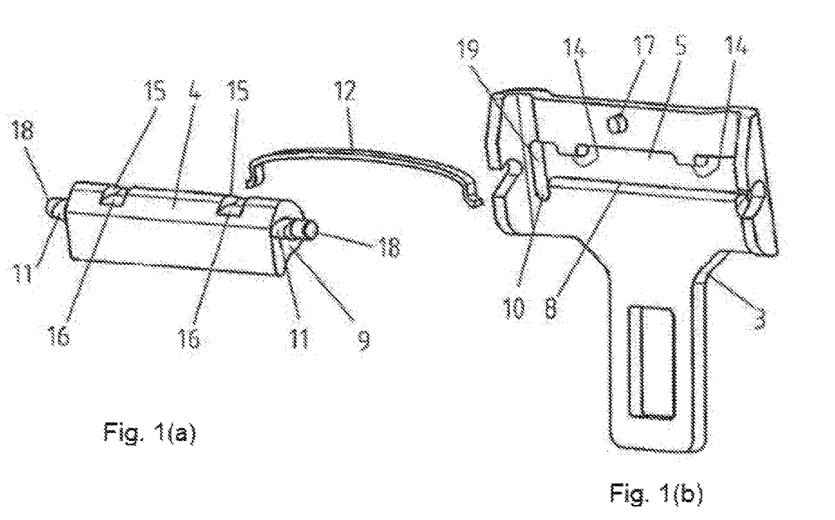
FIGS. 1(a) and 1(b): are exploded views of a first embodiment of a belt tongue.
Figure 2:
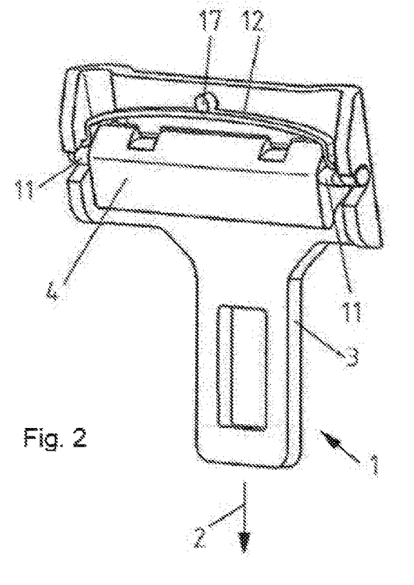
FIG. 2: shows a rear side of the belt tongue.
Figure 3:
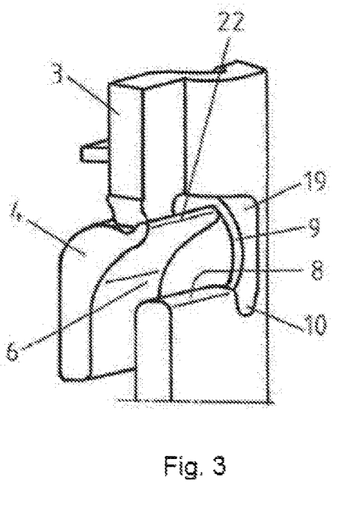
FIG. 3: shows a section of the belt tongue.
Figure 4:
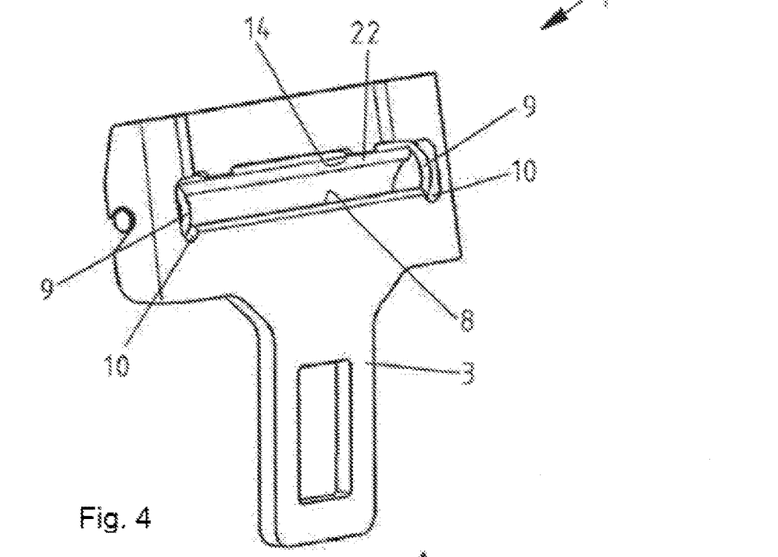
FIG. 4: shows a front side of the belt tongue.

The belt tongue 1 further includes a clamping element 4 that is pivotably supported in the tongue body 3 by bearing pins 18. A cam 11 tapering in one direction is formed adjacent to each bearing pin 18. In the assembled state the ends of the leaf spring 12 rest on the cam 11 such that a torque is introduced into the clamping element 4.

The clamping element 4 further includes grooves 15 with end surfaces 16 in which the projections 14 are disposed in the assembled state of the belt tongue 1.

The clamping element 4 further includes guide sections 9 in the lateral region which in the assembled state are at least partially disposed in the recess 10 of the cavity 5. As can be seen in particular in FIG. 3, a gap is formed between a clamping region 22 of the clamping element 4 and the clamping edge 8 of the cavity 5, through which a belt strap 7 is guidable. This gap 6 is delimited on both sides by the guide sections 9 of the clamping element 4, so that the belt strap 7 is disposed between the guide sections 9. The belt strap 7 thus cannot arrive between the clamping element 4 and a lateral edge 19 of the cavity 5.

Figures 5, 6:
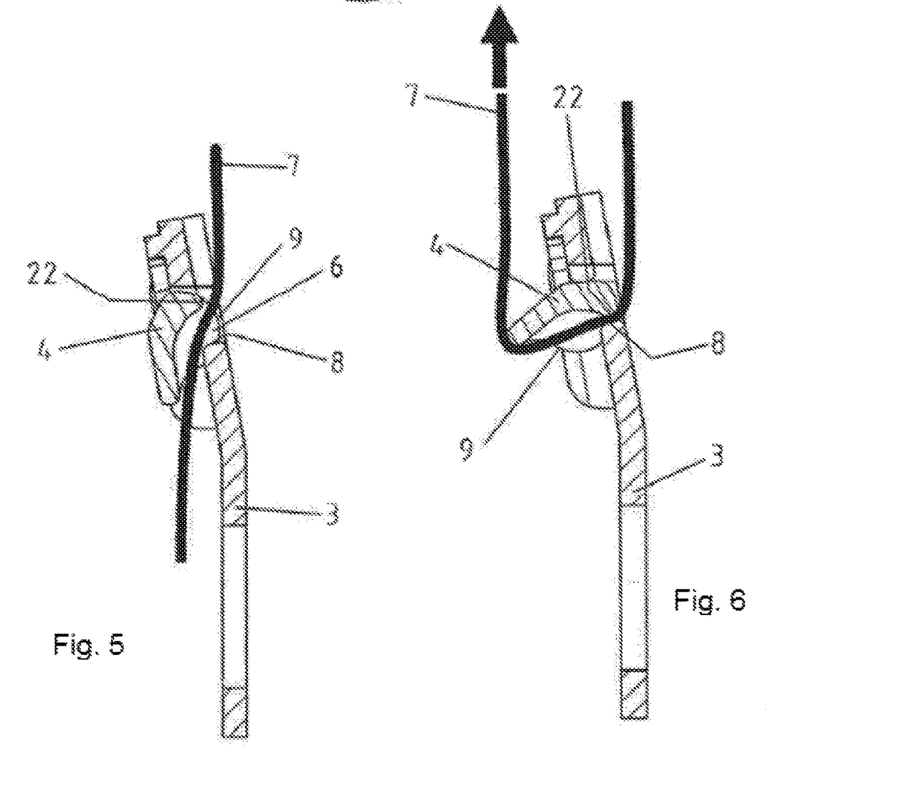
FIG. 5: is a sectional depiction through the belt tongue in a pass-through position.
FIG. 6: is a sectional view of the belt tongue in a stressed position.

As can be seen from FIG. 5, in a pass-through position the gap 6 formed between the clamping region 22 of the clamping element 4 and the clamping edge 8 of the cavity 5 is sufficiently large that the belt strap 7 is freely movable. The belt strap 7 here is laterally delimited by the guide sections 9.

If a force is now introduced into a lap-belt section of the belt strap 7, then the clamping element 4 is pivoted by this force so that the gap 6 diminishes is size until finally the belt strap 7 is clamped between the clamping region 22 of the clamping element 4 and the clamping edge 8, and thus a stressed position is reached as is depicted in FIG. 6. Moreover in this stressed position, the end surface 16 of the groove 15 comes into abutment with the projections 14, whereby the force acting on the belt strap 7 is limited.

Figure 7:
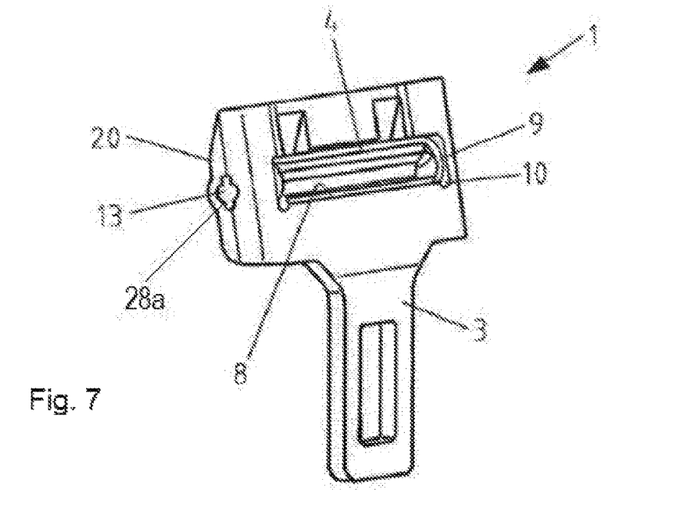
FIG. 7: is a front view of a second embodiment of a belt tongue.

In FIG. 7, a second embodiment of a belt tongue having all features essential to the invention is depicted, which differs from the first embodiment primarily through the provision of a pivotable support of the clamping element 4 and the applying of a restoring force, wherein in addition the function of the clamping element 4 and the guide section 9 attached thereto is identical to the first embodiment, so that hereinafter only the differences are discussed.

Figure 11:
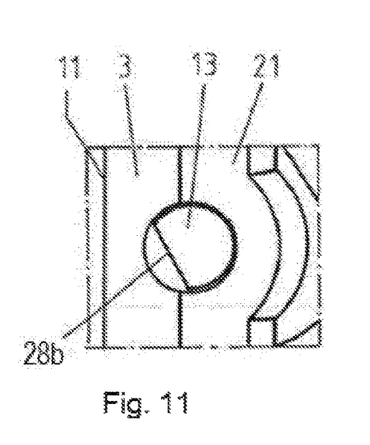

According to the second embodiment, the clamping element 4 is pivotably supported by an elastically deformable torsion bar 13 on the tongue body 3, wherein in the stressed position, the torsion bar 13 simultaneously exerts a restoring force on the clamping element 4. For this purpose the torsion bar 13 is attached on a first side 20 of the tongue body 3 for conjoint rotation therewith, i.e. they are fixed for non-rotatable relative motion), by means of a friction fit into a first socket 28*a* on the tongue body 3. Such connection is provided by the profiled head 35 of the torsion bar 13 which form fits into socket 28*a*. On the side 21 of the tongue body 3 opposite the first side 20, the torsion bar 13 which is guided through the entire clamping element 4 is rotatably supported in a socket 28*b* in the tongue body 3, as can be seen from FIG. 11. The end of the torsion bar 13 is permitted to rotate within socket 28*b*.

Figure 8:
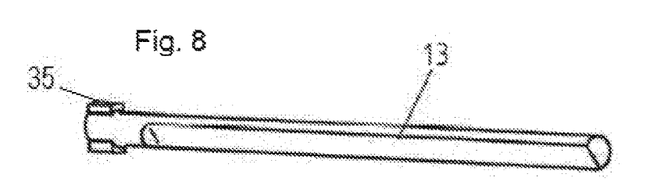
FIG. 8: shows a torsion bar of the second embodiment of the belt tongue.
Figure 9:
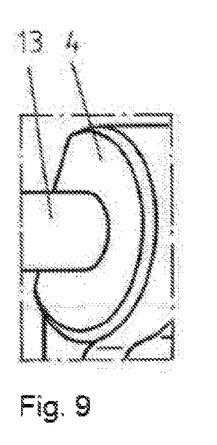
FIGS. 9-11: are detailed views of the second embodiment of the belt tongue.
Figure 10:
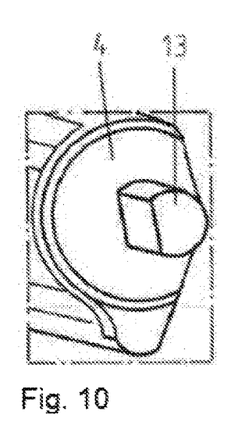
Figure 14:
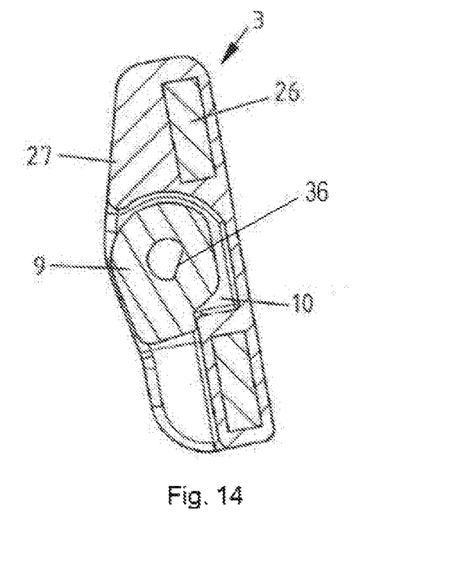
FIG. 14: is a further sectional view through the third embodiment of the belt tongue.

In order that the torsion bar 13 depicted in FIG. 8 can be deformed (twisted) over a longest possible length during a twisting (rotational) movement of the clamping element 4, the torsion bar 13 is only connected to the clamping element 4 for conjoint rotation therewith (i.e. rotatably fixed) on a side of the clamping element 4 associated with the second side 21 of the tongue body 3 by form fits provided by the mating cross-sectional configurations of the torsion bar 13 and an internal socket 36 at an end of the clamping element 4, as is depicted in FIGS. 10 and 14. The clamping element 4 further has an internal passageway (not shown) for torsion bar 13 which allows the torsion bar to twist between the ends of the clamping element 4. In this respect it can be seen in FIG. 9 that the torsion bar 13 is disposed on the side of the clamping element 4 associated with the first side 20 of the tongue body 3 rotatable with respect to the clamping element 4 in the socket 28.

If the clamping element 4 is now pivoted out of its pass-through position into its stressed position, the torsion bar 13 is twisted over almost its entire length between the attachment for conjoint rotation to the first side 20 of the clamping element 4 at socket 28*a* and the connection for conjoint rotation of the torsion bar 13 to the clamping element 4 at socket 36, wherein due to the resultant elastic deformation of the torsion bar 13, a restoring force is exerted on the clamping element 4.

Figure 12:
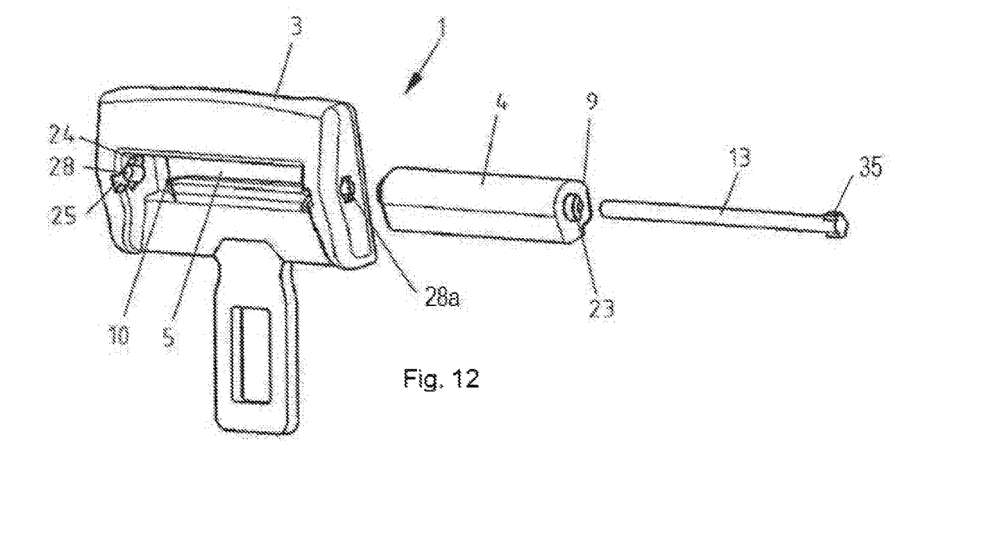
FIG. 12: is an exploded view of a third embodiment of the belt tongue.

In FIG. 12, a third embodiment of a belt tongue 1 having all essential features of the invention is depicted, wherein the functional principle of the belt tongue 1 essentially corresponds to the functional principle of the previously described belt tongues. Similar to the second embodiment, the belt tongue 1 includes a torsion bar 13, which exerts a restoring force on the clamping element 4 directed in the pass-through position during pivoting of the clamping element 4. In the following therefore mainly the differences to the above-described embodiments are discussed.

The clamping element 4 features guide elements 23 laterally outward on its guide sections 9. On lateral inner sides directed toward the cavity 5, the tongue body 3 features guide depressions 24 corresponding to the guide elements 23, and an assembly depression 25 adjoins each of these guide depressions. As can be seen in particular from the sectional view depicted in FIG. 13, which shows a section through the belt tongue 1 in the region of the guide element 23 and the guide cavity 24, the guide cavity 24 is configured in approximately a half-ring shape, to which the rectilinear assembly depression 25 connects. Due to the assembly depressions 25, the clamping element 4 can be brought into its assembly position with its quarter-ring-shaped guide elements 23. For the assembly, the clamping element 4 is linearly displaced on both sides with the guide elements 23 through the assembly depressions 25, wherein the clamping element 4 is prevented from slipping back against the now greater extension of the guide elements 23, as projected onto the width of the assembly depressions 25. Due to the guide elements 23 and the guide depressions 24, a pivoting support of the clamping element 4 in the tongue body 3 is thus achieved. In this context, the torsion bar 13 disposed in the sockets 28 in the clamping element 4 not only has the function of exerting a restoring force on the pivoted clamping element 4, but also the function of securing the clamping element 4 against slipping back through the assembly depressions 25 into a correspondingly pivoted position.

Figure 13:
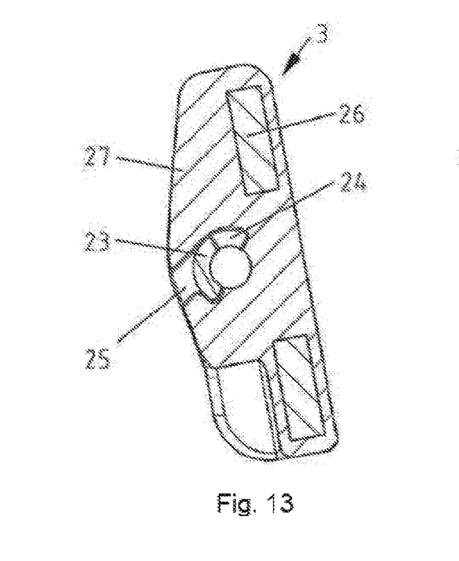
FIG. 13: is a sectional view through the third embodiment of the belt tongue.

As can also be seen from FIGS. 13 and 14, the tongue body 3 is formed of a metallic core 26 with molded-over plastic 27. In FIG. 14, a sectional view is shown through the tongue body 3 in the region of the guide section 9. As can be seen in a synopsis with FIG. 12, the guide section 9 is disposed in a recess 10 formed in the plastic 27, wherein the clamping element slides into abutment on the plastic 27 in the upper region of the cavity 5 during the pivoting movement.

Figure 15:
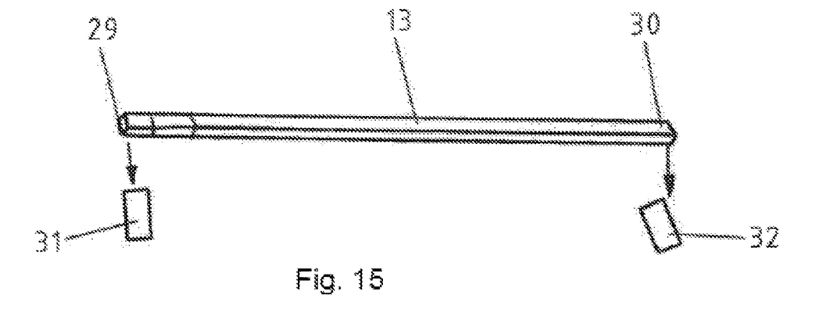
FIG. 15: shows a torsion bar of a fourth embodiment of the belt tongue.

In FIG. 15 a torsion bar 13 is shown for a fourth embodiment of a belt tongue 1 having all features essential to the invention. The torsion bar 13 includes a first end 29 and a second end 30. In the assembled state the torsion bar 13 is fixed so that it does not turn by the first end 29 in a socket 28 of a tongue body 3. The second end 30 is secured from twisting with respect to a clamping element 4, but it can be twisted with respect to a further socket in the tongue body 3. In the region of the first end 29 the torsion bar 13 has a first cross-sectional contour 31 and in the region of the second end 30, a second cross-sectional contour 32. The cross-sectional contours 31, 32 are identical in their shape, wherein, however, they are rotationally offset to each other with respect to a longitudinal axis of the torsion bar 13. The torsion bar 13 continuously transitions from the first end 29 to the second end 30 while maintaining the cross-sectional shape, wherein the orientation of the cross-sectional shape changes.

Figure 16:
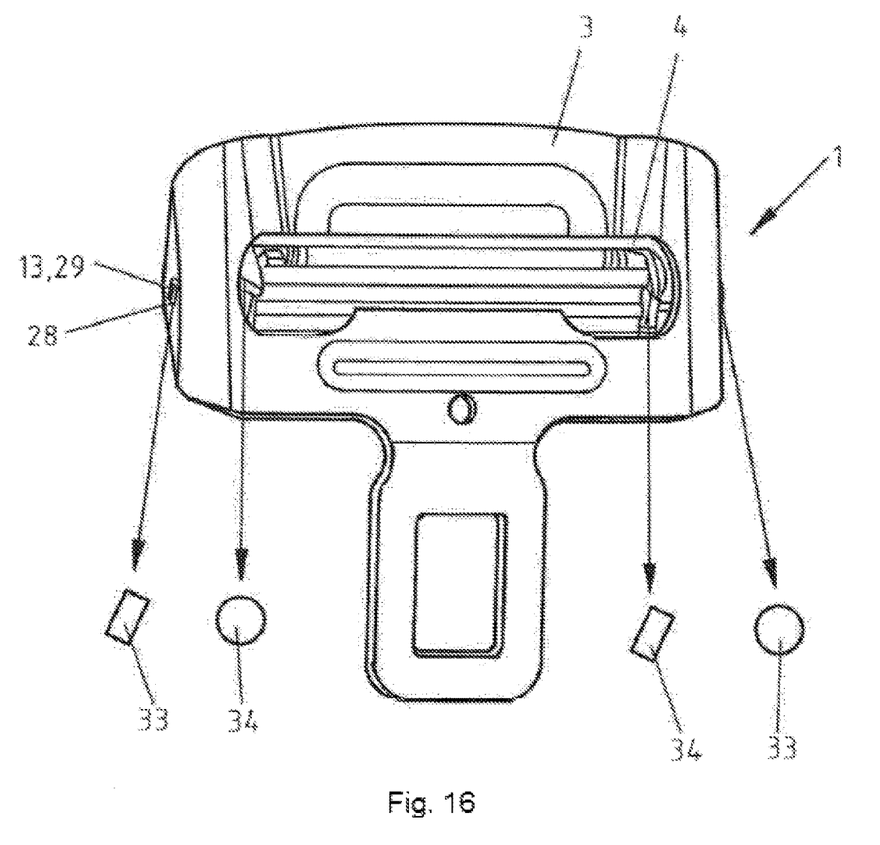
FIG. 16: illustrates a fourth embodiment of the belt tongue.

In FIG. 16 the belt tongue 1 is depicted with installed clamping element 4 and installed torsion bar 13. The tongue body 3 of the belt tongue 1 includes sockets 28 on its lateral walls, whose socket cross-sections 33 are respectively depicted on the bottom of FIG. 16. On the left side the socket 28 includes a socket cross-section 33 that corresponds in shape to the cross-sectional shape of the torsion bar 13. On the left side the socket 28 has a circular socket cross-section, so that the torsion bar 13 can rotate in this socket 28 by its second end 30. The clamping element 4 includes a channel for receiving the torsion bar 13 whose channel cross section 34 is indicated in the bottom of FIG. 16. On the left side the cross-section of the channel has a circular shape, while on the right side the cross-section of the channel has a rectangular shape corresponding to the cross-sectional shape of the torsion bar 13.

Figures 17A, 17B, 17C:
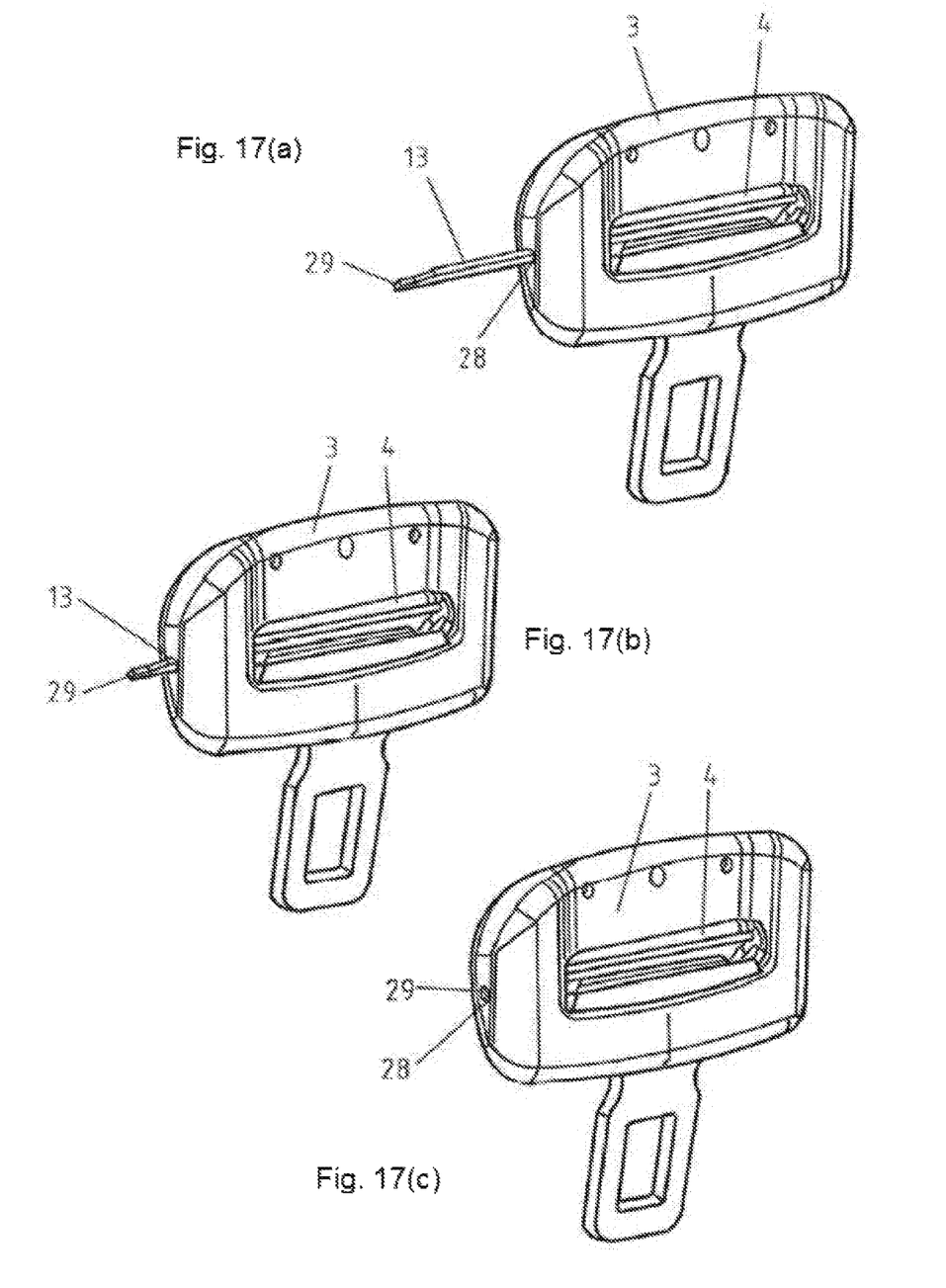
FIGS. 17(a), 17(b), and 17(c): show an assembly sequence of the fourth belt tongue.

In the assembly of the torsion bar 13 indicated from top to bottom in FIG. 17(*a*), the torsion bar 13 is initially introduced into the channel of the clamping element 4 through the socket 28. The clamping element here can initially be in any orientation since the torsion bar is rotatable relative to the clamping element on the left side depicted in the Figure, due to the circular channel cross-section 34. In order to push the torsion bar 4 farther into the clamping element 4 as shown in FIG. 17(*b*), the clamping element 4 should be located in its pass-through position so that the second end of the torsion bar 13 can engage in the cross-sectional contour of the channel adapted to the second end 30. In order that now the first end 29 of the torsion bar 13 can be introduced in the socket 28 in the tongue body, the torsion bar 13 having a twisted shape must be twisted by its first end 29 with respect to the second end 30 fixed against a relative rotation in the clamping element 4, whereby a torsional moment is generated in the torsion bar 30, which position is shown in FIG. 17(*c*). The restoring force resulting therefrom is directed in the pass-through position of the clamping element 4.

Figure 18:
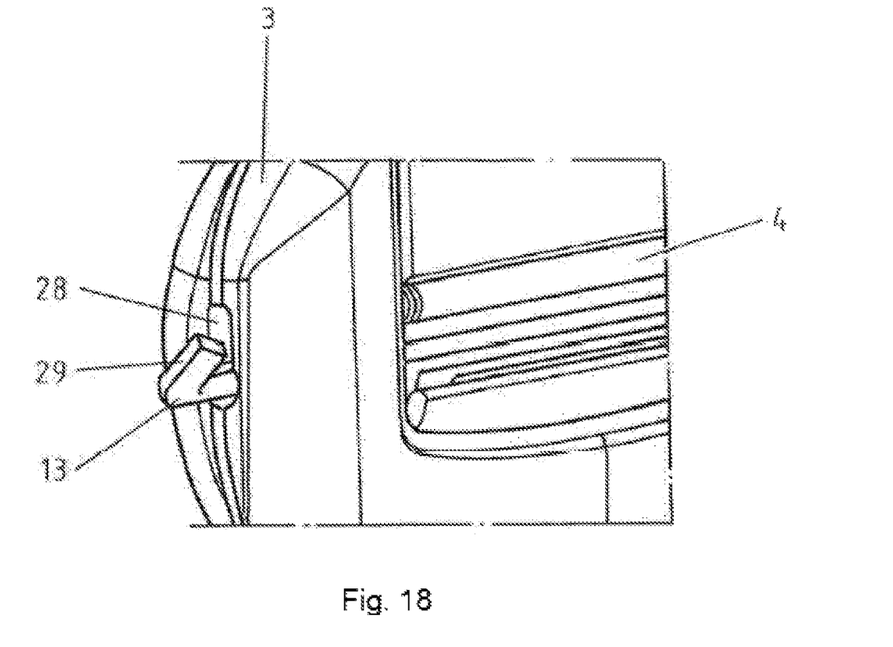
FIG. 18: is a detailed view of a fifth embodiment of the belt tongue.

In yet another embodiment according to FIG. 18 including all features essential to the invention, the torsion bar 13 is angled in the region of its first end 29. The torsion bar 13 already fixed to the clamping element 4 for conjoint rotation therewith by its second end 30, must be twisted by the first end 29 relative to the second end 30 so that the angled end 29 can engage in the correspondingly formed socket 28 in the belt body 3. Also with this embodiment, a pre-stress is generated in advance in the pass-through position.

While the above description constitutes the preferred embodiment of the present invention, it will be appreciated that the invention is susceptible to modification, variation and change without departing from the proper scope and fair meaning of the accompanying claims.

The invention claimed is:

1. A belt tongue for a motor vehicle seatbelt restraint system having a belt strap, comprising a tongue body extending in an insertion direction, wherein a clamping element is disposed such that the belt strap guided through a cavity in the tongue body and extending through a gap formed between the clamping element and the tongue body is movable in an unstressed pass-through position, and in a stressed position caused by a tensile force introduced in the belt strap, is clamped to a clamp edge of the cavity by the clamping element which is pivot-mounted in the tongue body and pivotable into the cavity, wherein in the stressed position, wherein a torsion bar exerts a restoring force on the clamping element directed toward the pass-through position of the clamping element, the torsion bar being a bar extending from a first end to a second end, wherein the first end of the torsion bar is secured in a first socket of the tongue body in a non-rotating manner and the second end of the torsion bar is placed in a second socket of the tongue body in a rotating manner, and wherein the clamping element is disposed between the first socket and the second socket of the tongue body and includes a channel having a first side and a second side, and a cross-section of the first side guides the torsion bar in a rotating manner and a cross-section of the second side corresponds to a cross-sectional shape of the torsion bar for securing the torsion bar to the clamping element in a non-rotating manner such that a pivoting movement between the tongue body and the clamping element causes torsional deflection of the torsion bar.

2. A belt tongue according to claim 1, wherein the torsion bar is only fixed at the first end on the first socket of the tongue body and is connected to the clamping element at the second end on the second side of the clamping element which is not associated with the first socket of the tongue body associated with the torsion bar.

3. A belt tongue according to claim 1 further comprising guide sections disposed laterally on the clamping element, between which the belt strap extends so that in a lateral region of the cavity the belt strap does not arrive between the clamping element and the tongue body.

4. The belt tongue according to claim 1, wherein guide elements project laterally from the clamping element, which guide elements are at least partially surrounding guide depressions in the tongue body, wherein the guide elements and the guide depressions are formed such that the pivoting movement of the clamping element is guided by the guide elements.

5. The belt tongue according to claim 4, wherein a rectilinear assembly depression extending up to an edge of the tongue body connects to each of the guide depressions, by which the clamping element is linearly displaced during assembly with the guide elements, wherein the clamping element is secured against sliding-back by a subsequent pivoting.

6. The belt tongue according to claim 1, wherein the belt strap is pulled transverse to the insertion direction through the cavity in the tongue body.

7. The belt tongue according to claim 1, wherein the torsion bar in the unstressed pass-through position exerts a torsional force onto the clamping element directed opposite the stressed position while the clamping element is in the unstressed pass-through position.

8. The belt tongue according to claim 7, wherein the torsion bar is designed such that the first end of the torsion bar fixed in the first socket for securing to the tongue body, must be twisted with respect to the second end fixed to the clamping element, while the clamping element is located in the unstressed pass-through position.

9. The belt tongue according to claim 8, further comprising a first cross-sectional contour that corresponds in the cross-sectional shape to a second cross-sectional contour of the second end, wherein in the unstressed state of the torsion bar, the first and second cross-sectional contours are rotationally offset with respect to each other about an axis of rotation and a transition from the first cross-sectional contour to the second cross-sectional contour is continuous, while maintaining the cross-sectional shape, so that with the second end of torsion bar fixedly inserted in the clamping element for conjoint rotation, the torsion bar is torsionally deformed about the axis of rotation by insertion of the first end into the first socket of the tongue body.

10. The belt tongue according to claim 1, wherein the cross-section of the first side of the channel is configured for allowing the clamping element to be initially in a non-pass-through position when the torsion bar is pushed into the clamping element through the first socket on the outside of the tongue body.

11. A belt tongue for a motor vehicle seatbelt restraint system having a belt strap, comprising a tongue body extending in an insertion direction, wherein a clamping element is disposed such that the belt strap guided through a cavity in the tongue body and extending through a gap formed between the clamping element and the tongue body is movable in an unstressed pass-through position, and in a stressed position caused by a tensile force introduced in the belt strap, is clamped to a clamp edge of the cavity by the clamping element which is pivot-mounted in the tongue body and pivotable into the cavity, wherein in the stressed position a torsion bar exerts a restoring force on the clamping element directed toward the pass-through position of the clamping element, the torsion bar in the form of a unitary structure having a first end and a second end, and a first cross-sectional contour on the first end of the torsion bar corresponds in a cross-sectional shape to a second cross-sectional contour on the second end of the torsion bar, wherein in the stressed state of the torsion bar, the first and second cross-sectional contours of the torsion bar are rotationally offset with respect to each other about its longitudinal axis such that the torsion bar is torsionally deformed about the axis of rotation by insertion of the first end into a first socket of the tongue body with the second end secured to the clamping element for conjoint rotation, whereby a torsional force is applied onto the clamping element in the pass-through position.

12. A belt tongue for a motor vehicle seatbelt restraint system having a belt strap, comprising a tongue body extending in an insertion direction, wherein a clamping element is disposed such that the belt strap guided through a cavity in the tongue body and extending through a gap formed between the clamping element and the tongue body is movable in an unstressed pass-through position, and in a stressed position caused by a tensile force introduced in the belt strap, is clamped to a clamp edge of the cavity by the clamping element which is pivot-mounted in the tongue body and pivotable into the cavity, wherein in the stressed position a torsion bar exerts a restoring force on the clamping element directed toward the pass-through position of the clamping element, the torsion bar in the form of a unitary structure having a first end and a second end, and the torsion bar has a cross-sectional shape according to a longitudinal axis of the torsion bar, and wherein a first cross-sectional contour of the first end and a second cross-sectional contour of the second end are rotationally offset to each other with respect to the longitudinal axis of the torsion bar while maintaining the identical cross-sectional shape of the torsion bar.

* * * * *